US012296381B2

(12) United States Patent
Ma et al.

(10) Patent No.: US 12,296,381 B2
(45) Date of Patent: May 13, 2025

(54) DIE MOLDING APPARATUS

(71) Applicant: SHENZHEN UNIVERSITY, Guangdong (CN)

(72) Inventors: Jiang Ma, Guangdong (CN); Jian Yang, Guangdong (CN)

(73) Assignee: SHENZHEN UNIVERSITY, Guangdong (CN)

(*) Notice: Subject to any disclaimer, the term of this patent is extended or adjusted under 35 U.S.C. 154(b) by 54 days.

(21) Appl. No.: 18/022,211

(22) PCT Filed: Aug. 23, 2021

(86) PCT No.: PCT/CN2021/114021
§ 371 (c)(1),
(2) Date: Feb. 20, 2023

(87) PCT Pub. No.: WO2022/042468
PCT Pub. Date: Mar. 3, 2022

(65) Prior Publication Data
US 2024/0033817 A1 Feb. 1, 2024

(30) Foreign Application Priority Data
Aug. 28, 2020 (CN) ........................ 202010884952.X

(51) Int. Cl.
*B22D 17/32* (2006.01)
*B21J 1/00* (2006.01)
(Continued)

(52) U.S. Cl.
CPC .............. *B22D 17/32* (2013.01); *B21J 1/006* (2013.01); *B21J 5/02* (2013.01); *B22D 17/02* (2013.01); *C21D 9/0062* (2013.01); *F27D 15/02* (2013.01)

(58) Field of Classification Search
CPC ........ B22D 18/02; C21D 9/0062; B21J 1/006; B21J 5/02; F27D 15/02
See application file for complete search history.

(56) References Cited

U.S. PATENT DOCUMENTS 3,633,895 A 1/1972 Genrich et al.
4,579,523 A * 4/1986 Laiquddin ................ C21D 1/74 432/5
(Continued)

FOREIGN PATENT DOCUMENTS

CN 1456401 A 11/2003
CN 101468370 B 3/2012
(Continued)

OTHER PUBLICATIONS

Machine Translation of CN 1456401A (published Nov. 19, 2003, cited in IDS filed Feb. 20, 2023). (Year: 2003).*

*Primary Examiner* — Kevin E Yoon
*Assistant Examiner* — Jacky Yuen
(74) *Attorney, Agent, or Firm* — Brooks Kushman P.C.

(57) ABSTRACT

The present application relates to the technical field of amorphous alloy molding apparatuses, and more particularly to a die molding apparatus. The die molding apparatus includes: a forming structure, a material loading structure, and a vacuum pumping structure. The forming structure includes a forming furnace body having a heating cavity, a material waiting housing having a transition cavity, a feeding pipe having two ends respectively connected with the heating cavity and the transition cavity, and a vacuum control valve arranged on the feeding pipe. The material loading structure includes a material loading arm and a material loading driving mechanism, one end of the material loading arm is located in the transition cavity, and the other
(Continued)

end of the material loading arm is penetrated through a material loading hole sealingly.

12 Claims, 3 Drawing Sheets

(51) Int. Cl.

| | |
|---|---|
| ***B21J 5/02*** | (2006.01) |
| ***B22D 17/02*** | (2006.01) |
| ***C21D 9/00*** | (2006.01) |
| ***F27D 15/02*** | (2006.01) |

(56) References Cited

U.S. PATENT DOCUMENTS

| | | | | |
|---|---|---|---|---|
| 5,168,916 | A * | 12/1992 | Doriath ................ | B22D 27/045 164/348 |
| 5,176,923 | A | 1/1993 | Ito | |
| 2007/0122761 | A1 | 5/2007 | Katsumata | |
| 2015/0273566 | A1 * | 10/2015 | Nakamura ........... | B22D 17/007 72/342.5 |

FOREIGN PATENT DOCUMENTS

| | | | |
|---|---|---|---|
| CN | 203011128 | U | 6/2013 |
| CN | 108027207 | A | 5/2018 |
| CN | 209639512 | U | 11/2019 |
| CN | 209652150 | U | 11/2019 |
| CN | 110961514 | A | 4/2020 |
| CN | 108453203 | B | 6/2020 |
| TW | 200916223 | A | 4/2009 |

* cited by examiner

DIE MOLDING APPARATUS

CROSS REFERENCE TO RELATED APPLICATION

This present application is a National Stage Appl. of International Patent Application No. PCT/CN2021/114021 with an international filing date of Aug. 23, 2021 designating the United States, now pending, and further claims foreign priority benefits to Chinese Patent Application No. 202010884952.X filed on Aug. 28, 2020. The contents of all of the aforementioned applications, including any intervening amendments thereto, are incorporated herein by reference.

FIELD

The present application relates to the technical field of amorphous alloy molding apparatuses, and more particularly to a die molding apparatus.

BACKGROUND

The statements herein only provide background information related to the present application, and do not necessarily constitute as prior art.

Amorphous alloys have excellent mechanical properties, resistance to various media corrosion, soft magnetic, hard magnetic and unique expansion characteristics and other physical properties. Amorphous alloys have good processability near the glass transition temperature thereof, so it is often necessary to heat the amorphous alloys to the supercooled liquid phase region and conduct thermoplastic forming to obtain the required structure.

However, in the thermoplastic forming process of the amorphous alloys, especially in continuous and repetitive production and manufacturing, the amorphous alloys are usually heated from room temperature to the supercooled liquid phase region thereof, and then the amorphous alloys are cooled to the room temperature after thermoplastic forming. Since the amorphous alloys at high temperatures are prone to oxidation with air, after a single processing, the processed amorphous alloy needs to be cooled along with the forming furnace body, which leads to a long heating time. During this cooling process, the amorphous alloys are also prone to characteristic changes; in addition, during the thermoplastic forming of a plurality of amorphous alloys, the heating cavity of the forming furnace body needs to be vacuumized again for each thermoplastic forming, which results in a long working tempo and low efficiency.

SUMMARY

One of objects of embodiments of the present application is to provide a die molding apparatus, in order to solve the problem that how to reduce the manufacturing tempo of the amorphous alloys, and to improve the manufacturing efficiency and safety.

In order to solve above technical problem, the technical solution adopted in embodiments of the present application is:

A die molding apparatus is provided for thermoplastic forming of an amorphous alloy, and the die molding apparatus includes:

a forming structure, including: a forming furnace body with a heating cavity; a material waiting housing with a transition cavity, a feeding pipe provided with two ends respectively in communicated with the heating cavity and the transition cavity, and a vacuum control valve arranged on the feeding pipe;

a material loading structure, including: a material loading arm and a material loading driving mechanism; the material waiting housing is provided with a material loading hole being in communicated with the transition cavity, one end of the material loading arm is located in the transition cavity and configured for carrying the amorphous alloy, the other end of the material loading arm is configured to penetrate through the material loading hole sealingly and slidably, and the material loading driving mechanism is connected with the other end of the material loading arm; and a vacuum pumping structure, configured for pumping out gas in the heating cavity and the transition cavity, such that vacuum degrees of the heating cavity and the transition cavity reach a predetermined value;

the vacuum control valve has a turn-on state and a turn-off state, and when the vacuum control valve is in the turn-on state, the feeding pipe communicates the heating cavity and the transition cavity, the material loading driving mechanism drives the material loading arm to slide, such that the material loading arm carries the amorphous alloy to the heating cavity or the amorphous alloy back to the transition cavity through the feeding pipe; and when the vacuum control valve is in the turn-off state, the heating cavity is sealed and isolated from the transition cavity.

In an embodiment, the forming structure further includes: a heat insulation mechanism comprising a heat insulation shield arranged in the heating cavity and a heat insulation driver connected with the forming furnace body; the heat insulation driver drives the heat insulation shield to seal an orifice of the feeding pipe, so as to prevent heat from entering the transition cavity through the feeding pipe.

In an embodiment, the die molding apparatus further includes: a mold mechanism; and the mold mechanism includes: an upper pressure head arranged in the heating cavity, a lower pressure head located below the upper pressure head and arranged slidably relative to the upper pressure head, a forming driving mechanism connected with the forming furnace body and configured for driving the lower pressure head to move up and down relative to the upper pressure head, and a forming mold detachably arranged on the lower pressure head; the forming mold is provided with a forming cavity configured for accommodating the amorphous alloy, and the lower pressure head moves toward the upper pressure head to press against the forming mold to plastically form the amorphous alloy.

In an embodiment, the material loading arm includes an arm body and a clamping claw arranged at an end of the arm body, the other end of the arm body passes through the material loading hole and is connected with the material loading driving mechanism, the clamping claw is located in the transition cavity and configured to detachably clamp the forming mold.

In an embodiment, the clamping claw is provided with a clamping groove, and an end of the forming mold is champed in the clamping groove.

In an embodiment, groove walls on both sides of the clamping groove are protruded with positioning blocks, and positions on the forming mold corresponding to the positioning blocks are provided with positioning grooves matched with the positioning blocks.

In an embodiment, the die molding apparatus further includes a cooling structure configured for cooling the forming mold.

In an embodiment, the cooling structure includes a lower cooling column vertically arranged and provided with a lower cooling channel; an end of the lower cooling column is located in the transition cavity and provided with a cooling end surface configured for placing the forming mold, and the other end of the lower cooling column is located outside of the transition cavity and connected with an external cooling water source.

In an embodiment, the lower cooling column is connected with the material waiting housing slidably and sealingly.

In an embodiment, the cooling structure further includes a cooling driving mechanism for driving the lower cooling column to slide up and down, and an upper cooling column arranged opposite to the lower cooling column, the upper cooling column is provided with an upper cooling channel.

In an embodiment, the material waiting housing is provided with a discharge port arranged in communicated with the transition cavity, and the die molding apparatus further includes a blanking groove, one end of the blanking groove is connected with the discharge port, and the other end of the blanking groove is arranged adjacent to the cooling end surface.

In an embodiment, the material waiting housing is further provided with a feeding port, and the die molding apparatus further includes a discharging valve configured for sealing the discharging port and a feeding valve configured for sealing the feeding port.

In an embodiment, the forming furnace body includes a furnace body provided with the heating cavity and a heating mechanism arranged in the heating cavity.

The beneficial effect of the die molding apparatus provided by the embodiments of the present application is that: the amorphous alloy is sent into the heating cavity that has been heated, which can realize the rapid temperature rise of the amorphous alloy. The present application is provided with the transition cavity and the vacuum degree of the transition cavity is pumped to a predetermined value, after the amorphous alloy has completed the thermoplastic forming, the vacuum control valve is turned on, and the processed amorphous alloy is conveyed back to the transition cavity through the material loading arm, then the vacuum control valve is turned off, the heating cavity is kept at a predetermined vacuum degree and the amorphous alloy is cooled in the transition cavity, so that the processed amorphous alloy does not need to be cooled with the forming furnace body, and the cooling efficiency is high to achieve rapid cooling. Moreover, the heat of the forming furnace body is retained to save energy consumption, and the temperature in the heating cavity can rise to the predetermined temperature in a short time in the next thermoplastic forming process, thus the thermoplastic forming efficiency of the amorphous alloy is further improved. In addition, the amorphous alloy is taken and placed in the transition cavity with a low temperature, the safety is high.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being “fixed to” or “disposed on” another component, it can be directly or indirectly on another component. When a component is referred to as being “connected to” another component, it can be directly or indirectly connected to another component. It needs to be understood that, directions or location relationships indicated by terms such as “up”, “down”, “left”, “right”, and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn’t be considered as any limitation to the present application. The terms “the first” and “the second” are only used in describe purposes, and should not be considered as indicating or implying any relative importance, or impliedly indicating the number of indicated technical features, “a plurality of” means two or more, unless there is additional explicit and specific limitation.

In order to explain the technical solution described in the present application, the following is a detailed description in combination with the specific drawings and embodiments.

Figure 1:
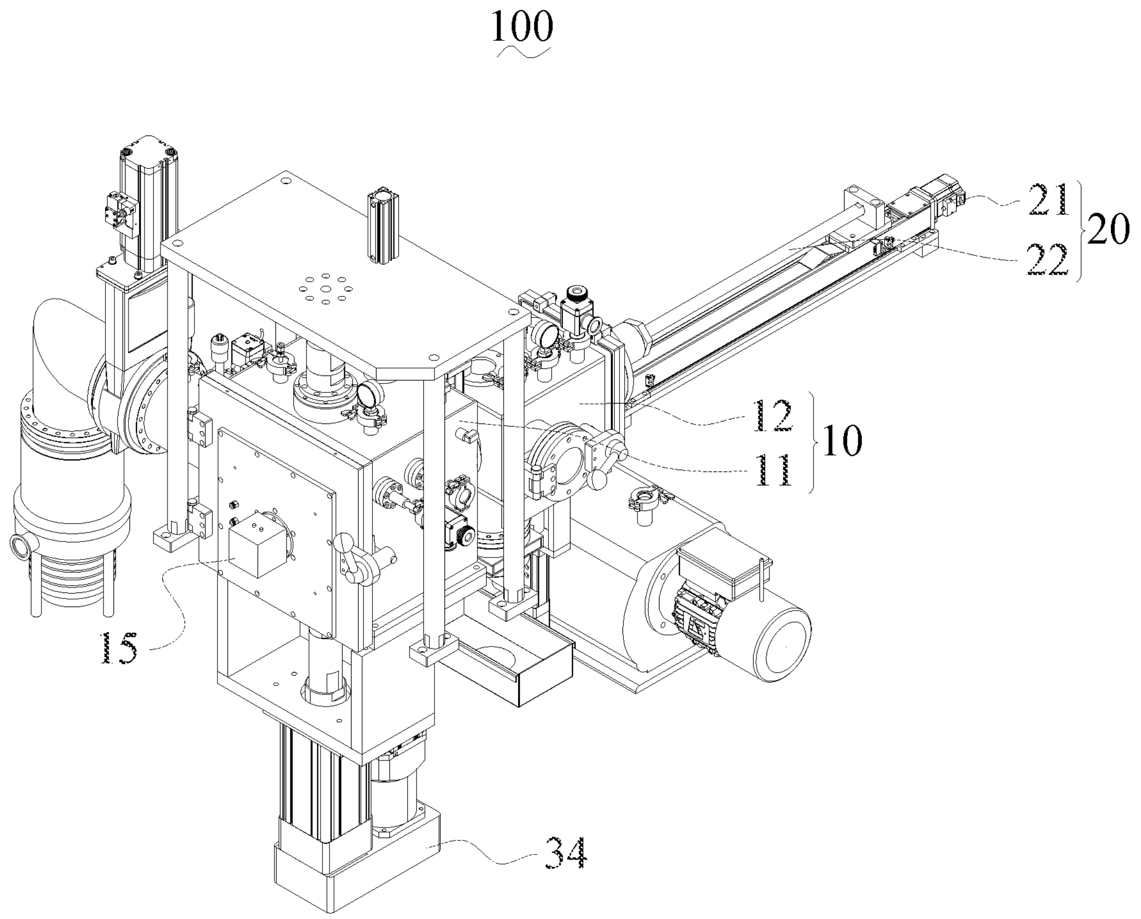
FIG. 1 is a structural schematic view of a die molding apparatus provided by an embodiment of the present application.
Figure 2:
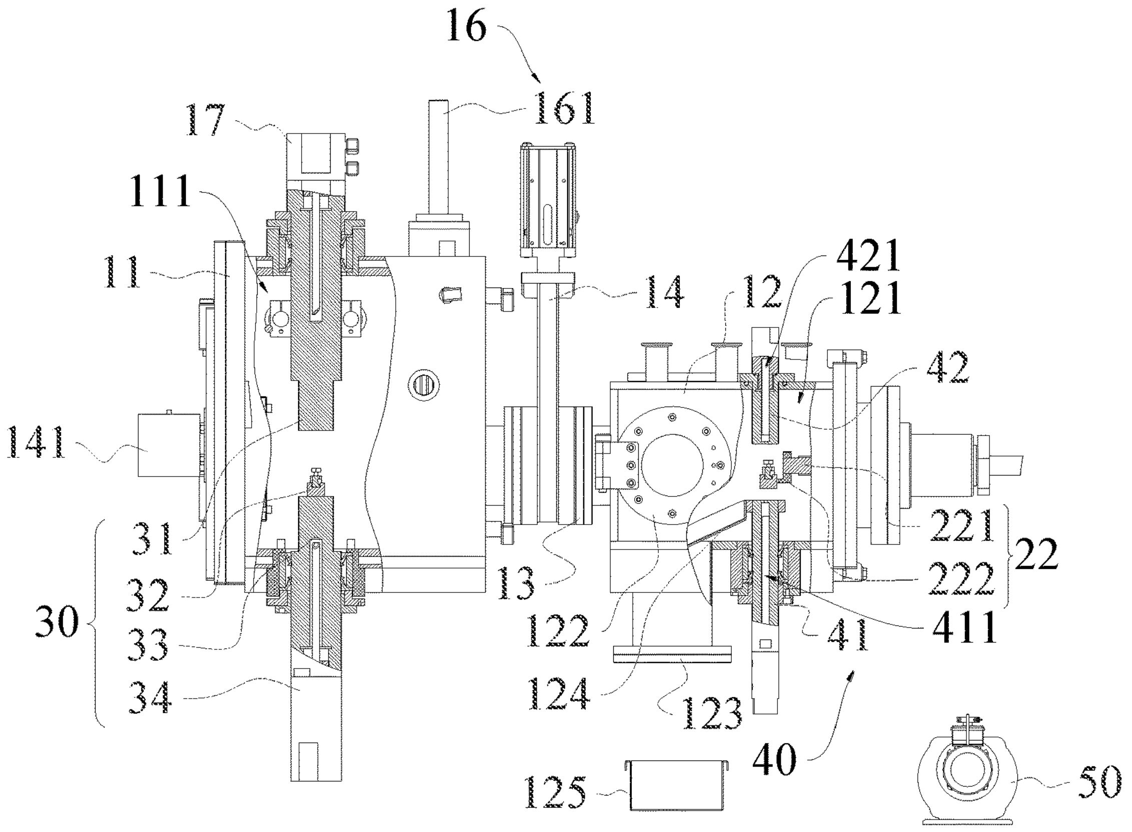
FIG. 2 is a partially sectional schematic view of the die molding apparatus in FIG. 1.
Figure 3:
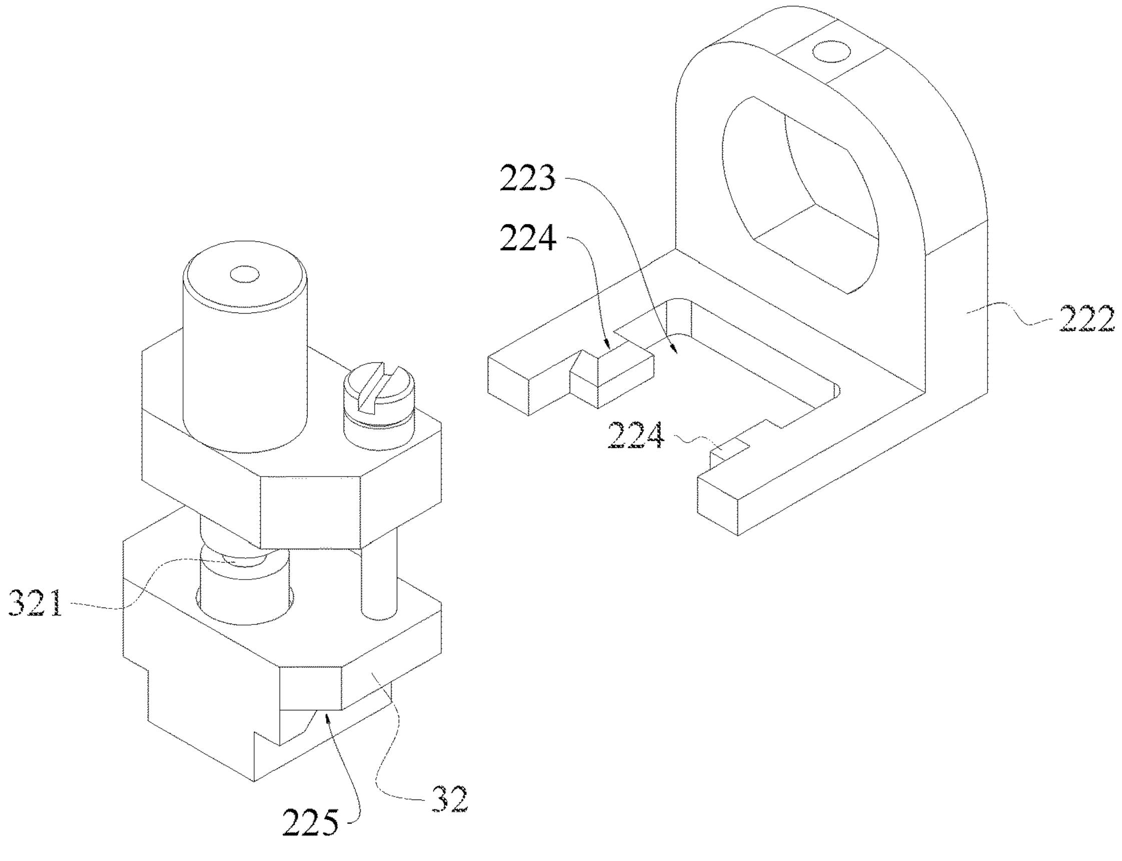
FIG. 3 is a schematic view of a forming mold matched with a champing claw in an embodiment in FIG. 1.

As shown in FIGS. 1 to 3. The embodiment of the present application provides a die molding apparatus 100, which is used for thermoplastic forming of amorphous alloy 321. The die molding apparatus includes a forming structure 10, a material loading structure 20 and a vacuum pumping structure 50. The forming structure 10 includes a forming furnace body 11 with a heating cavity 111, a material waiting housing 12 with a transition cavity 121, a feeding pipe 13 with two ends respectively in communicated with the heating cavity 111 and the transition cavity 121, and a vacuum control valve 14 arranged on the feeding pipe 13. In an embodiment, the heating cavity 111 heats the amorphous alloy to its supercooled liquid phase region under a predetermined vacuum degree. The material loading structure 20 includes a material loading arm 22 and a material loading driving mechanism 21. The material waiting housing 12 is provided with a material loading hole arranged in communicated with the transition cavity 121. One end of the material loading arm 22 is located in the transition cavity 121 and is used for carrying the amorphous alloy 321. The other end of the material loading arm 22 is configured to penetrate through the material loading hole sealingly and slidably. In an embodiment, the feeding pipe 13 and the material loading arm 22 are respectively located at both ends of the material waiting housing 12. The material loading driving mechanism 21 is connected to the other end of the material loading arm 22. The material loading driving mechanism 21 is used to drive the material loading arm 22 to slide back and forth, so as to convey the amorphous alloy 321 from the transition cavity 121 to the heating cavity 111, or convey the amorphous alloy 321 from the heating cavity 111 back to the transition cavity 121. The vacuum pumping structure 50 is used for pumping out the gas in the heating cavity 111 and/or the transition cavity 121. In an embodiment, the vacuum pumping structure 50 includes a mechanical pump and a molecular pump, the vacuum of the heating cavity 111 and/or the transition cavity 121 is firstly pumped to less than 1*10−1 Pa through the mechanical pump, and the vacuum of the heating cavity 111 and/or the transition cavity 121 is then pumped to less than 5*10−5 Pa through the molecular pump. The vacuum control valve 14 has a turn-on state and a turn-off state. When the vacuum control valve 14 is in the turn-on state, the feeding pipe 13 is in communicated with the heating cavity 111 and the transition cavity 121, and the loading driving mechanism 21 drives the material loading arm 22 to slide, so that the material loading arm 22 conveys the amorphous alloy 321 to the heating cavity 111 or the amorphous alloy 321 from the heating cavity 111 back to the transition cavity 121 through the feeding pipe 13. When the vacuum control valve 14 is turned off, the heating cavity 111 and the transition cavity 121 are sealed and isolated.

As shown in FIGS. 1 and 3, the present application is provided with the transition cavity 121 and the vacuum degree of the transition cavity 121 is pumped to a predetermined value, after the amorphous alloy 321 has completed the thermoplastic forming, the vacuum control valve 14 is turned on, and the processed amorphous alloy 321 is conveyed back to the transition cavity 121 through the material loading arm 22, then the vacuum control valve 12 is turned off, the heating cavity 111 is kept at a predetermined vacuum degree and the amorphous alloy 321 is cooled in the transition cavity 121, so that the processed amorphous alloy 321 does not need to be cooled with the forming furnace body 11, and the cooling efficiency is high. Moreover, the heat of the forming furnace body 11 is retained, and the temperature in the heating cavity 111 can rise to the predetermined temperature in a short time in the next thermoplastic forming process, thus the thermoplastic forming efficiency of the amorphous alloy is further improved, and tempo is reduced.

As shown in FIGS. 1 and 3, in an embodiment, the volume of the heating cavity 111 is larger than the volume of the transition cavity 121. Therefore, during the next thermoplastic forming, only a small amount of gas in the transition cavity 121 needs to be extracted, so that the vacuum in the transition cavity 121 is not lower than the vacuum in the heating cavity 111. Then, the vacuum control valve 14 is turned on, and the amorphous alloy 321 to be processed is conveyed to the heating cavity 111 through the material loading arm 22, which ultimately improves the production efficiency.

In an embodiment, a material waiting area is arranged in the transition cavity 121, and the amorphous alloy 321 to be thermoplastic formed can be placed in the material waiting area in advance, and the vacuum degree of the transition cavity 121 can be pumped to the predetermined value at the same time. After the thermoplastic forming of the previous amorphous alloy 321 is completed, it is conveyed back to the transition cavity 121, and then the amorphous alloy 321 in the material waiting area is conveyed to the heating cavity 111 to continue the thermoplastic forming of the amorphous alloy 321, so as to achieve continuous production.

As shown in FIGS. 1 and 3, in an embodiment, the forming structure 10 further includes a heat insulation mechanism 16, which includes a heat insulation shield arranged in the heating cavity 111 and a heat insulation driver 161 connected to the forming furnace body 11. The heat insulation driver 161 drives the heat insulation shield to seal the orifice of the feeding pipe 13 to prevent heat from entering the feeding pipe 13. In an embodiment, when the vacuum control valve 14 is in the turn-on state, the heat insulation driver 161 drives the heat insulation shield to open the orifice of the feeding pipe 13; when the vacuum control valve 14 is turned off, the heat insulation driver 161 drives the heat insulation shield to seal the orifice of the feeding pipe 13. Alternatively, the heat insulation shield can be made of molybdenum and stainless steel.

Figure 4:
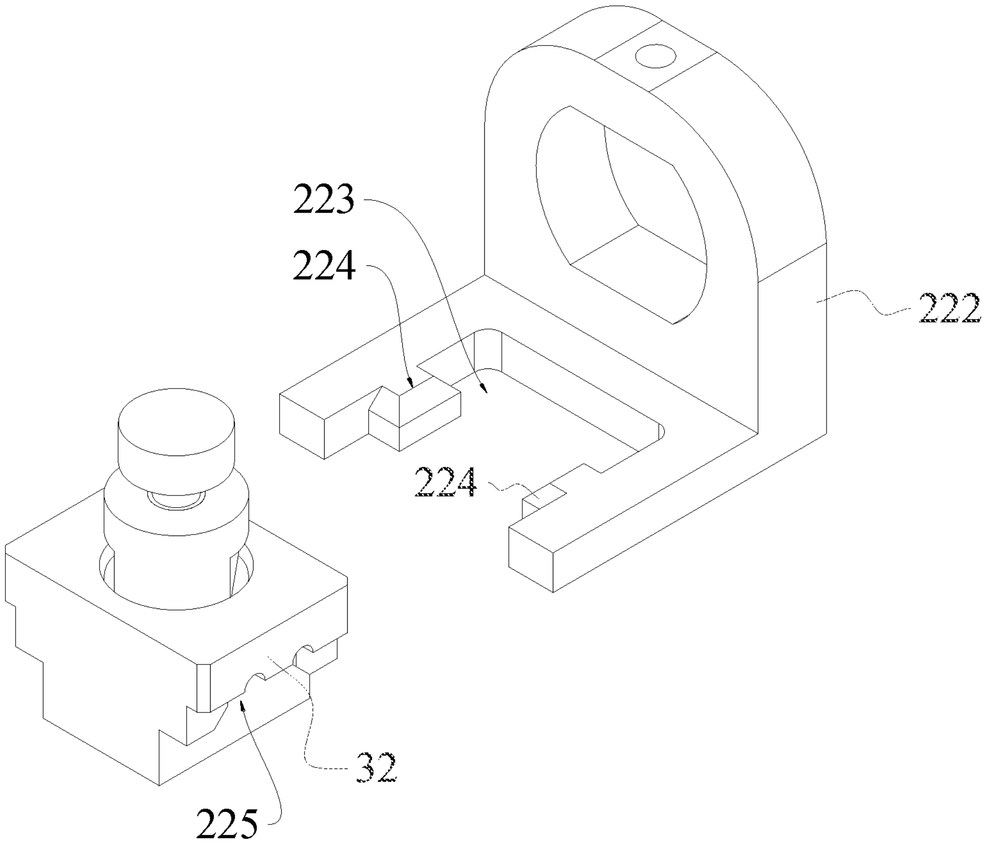
FIG. 4 is a schematic view of a forming mold matched with a champing claw in another embodiment in FIG. 1.

As shown in FIGS. 3 and 4, in an embodiment, the die molding apparatus 100 further includes a mold mechanism 30, which includes an upper pressure head 31 arranged in the heating cavity 111, a lower pressure head 33 located below the upper pressure head 31 and slidably arranged with respect to the upper pressure head 31, a forming driving mechanism 34 connected with the forming furnace body 11 and used to drive the lower pressure head 33 to move up and down with respect to the upper pressure head 31, and a forming mold 32 detachably arranged on the lower pressure head 33; the forming mold 32 is provided with a forming cavity for accommodating the amorphous alloy 321, and the lower pressure head 33 moves toward the upper pressure head 31 and presses the forming mold 32 to form the amorphous alloy. In an embodiment, the forming furnace body 11 is provided with a forming hole, and one end of the lower pressure head 33 is slidably and sealing penetrated the forming hole to connect the forming driving mechanism. In an embodiment, the forming driving mechanism can be a servo motor.

In an embodiment, the driving force range of forming driving mechanism 34 for driving the lower pressure head 33 is 100-30000 N, the travel range of lower pressure head 33 is 0~50 mm, and the moving speed range of lower pressure head 33 is 0.01~2 mm/s; in an embodiment, the lower pressure head 33 pre-presses the forming mold 32 between the upper pressure head 31 and the lower pressure head 33 with a driving force of 100 N. In an embodiment, the die molding apparatus 100 further includes an infrared thermometer 141 connected to the forming furnace body 11. The infrared thermometer 141 directly detects the real-time temperature of the amorphous alloy 321 in the forming mold 32 through the temperature measurement window. When the temperature reaches the temperature conversion point Tg in the supercooled liquid phase region of the amorphous alloy 321, the forming driving mechanism 34 drives the lower pressure head 33 to move to pressurize the forming mold 32 and perform thermoplastic forming. In an embodiment, the temperature measuring window is made of vacuum glass. The infrared thermometer 141 directly detects the temperature of amorphous alloy 321 through non-contact manner, which is conducive to improving the forming quality, automatic feeding and discharging, and realizing continuous production.

As shown in FIGS. 1 and 3, in an embodiment, the die molding apparatus 100 further includes a pull pressure sensor 17 at which the upper pressure head 31 is provided. The pull pressure sensor 17 monitors the driving force received by the upper pressure head 31 in real time, and feeds back the monitoring results to the forming driving mechanism 34, so that the forming driving mechanism 34 can adjust the driving force, to form a closed-loop control system and accurately control the pressure. The maximum range of the pressure sensor 17 is 50000 N.

In an embodiment, the material loading arm 22 includes an arm body 221 and a clamping claw 222 arranged at one end of the arm body 221. The other end of the arm body 221 is penetrated the material loading hole and connected with the loading driving mechanism 21. The clamping claw 222 is located in the transition cavity 121 and is used to detachably clamp the forming mold 32. The forming mold 32 can be conveyed from the transition cavity 121 to the lower pressure head 33, or the forming mold 32 can be conveyed from the lower pressure head 33 back to the transition cavity 121 through clamping the forming mold 32 with the clamping claw 222. In an embodiment, the material loading driving mechanism 21 includes a servo motor, the speed range of the material loading arm 22 moving towards the lower pressure head 33 is 2~100 mm/s, the travel range of the material loading arm 22 is 0~650 mm, and the speed of the material loading arm 22 returning to the transition cavity 121 is 100 mm/s.

As shown in FIGS. 3 and 4, in an embodiment, the clamping claw 222 is provided with a clamping groove 223, and one end of the forming mold 32 is clamped to the clamping groove 223; the groove walls on both sides of the clamping groove 223 are convexly arranged with positioning blocks 224, and the positions of the forming mold 32 corresponding to each positioning block 224 are provided with positioning grooves 225 that are matched with the positioning blocks 224. The stability of the forming mold 32 in the conveying process can be improved through the matching of the positioning grooves 225 and the positioning blocks 224. In an embodiment, after the forming mold 32 is moved and transported to the lower pressure head 33, the forming driving mechanism 34 drives the lower pressure head 33 to rise a predetermined distance, so that the positioning grooves 225 and the positioning blocks 224 are separated from each other, and thus the forming mold 32 is completely released to the lower pressure head 33.

In an embodiment, the die molding apparatus 100 further includes a cooling structure 40 for cooling the forming mold 32. The cooling structure 40 includes a lower cooling column 41 vertically arranged and provided with a lower cooling channel 411. An end of the lower cooling column 41 is located in the transition cavity 121 and provided with a cooling end surface for placing the forming mold 32. The other end of the lower cooling column 41 is located outside the transition cavity 121 and is connected with an external cooling water source. In an embodiment, after the amorphous alloy 321 completes the thermoplastic forming, the material loading arm 22 carries the forming mold 32 to the cooling end surface of the lower cooling column 41, and the cooling end surface faces upwards, and the forming mold 32 is cooled through the cooling water in the lower cooling channel 411, thus the cooling efficiency of the forming mold 32 is improved.

As shown in FIGS. 1 and 3, in an embodiment, the lower cooling column 41 is connected with the material waiting housing 12 slidably and sealingly. The cooling structure 40 further includes a cooling driving mechanism for driving the lower cooling column 41 to slide up and down, and an upper cooling column 42 that is opposite to the lower cooling column 41. The upper cooling column 42 is provided with an upper cooling channel 421. The cooling driving mechanism drives the lower cooling column 41 to move upward, so that both ends of the forming mold 32 are respectively contacted with the upper cooling column 42 and the lower cooling column 41, thereby further improving the cooling efficiency of the forming mold 32. The upper cooling column 42 is provided therein with a thermocouple, and when the material is cooled to the predetermined temperature detected through the thermocouple, the cooling is stopped.

As shown in FIGS. 1 and 3, in an embodiment, inert gas can be released into the transition cavity 121 to further improve the cooling efficiency of the forming mold 32. The material waiting housing 12 is provided with a vacuum electromagnetic angle valve, which is used to monitor the air pressure in the transition cavity 121. After the air pressure in the transition cavity 121 is balanced with the atmospheric pressure, the gas cooling of the forming mold 32 is completed.

In an embodiment, the circulating cooling water with temperature of 300K is introduced into the lower cooling channel 411 and the upper cooling channel 421 to cool the forming mold 32 below a temperature of 425K.

As shown in FIGS. 1 and 3, in an embodiment, the material waiting housing 12 is provided with a discharge port which is in communicated with the transition cavity 121. The die molding apparatus 100 further includes a blanking groove 124, one end of the blanking groove 124 is connected to the discharge port, and the other end of the blanking groove 124 is adjacent to the cooling end surface.

In an embodiment, the die molding apparatus 100 further includes a receiving box 125 loaded with coolant. The receiving box 125 is located below the discharge port. After the forming mold 32 is transported to the cooling end surface, the cooling driving mechanism drives the lower cooling column 41 to rise by a predetermined distance, so that the positioning grooves 225 and the positioning blocks 224 are separated from each other, the loading driving mechanism 21 drives the material loading arm 22 to retract, and the cooling driving mechanism drives the lower cooling column 41 to fall by a predetermined distance, such that the material loading arm 22 is driven by the material loading driving mechanism 21 to push the forming mold 32 into the blanking groove 124, so that the forming mold 32 falls into the receiving box 125 from the discharge port, and the receiving box 125 is located below the discharge port.

In an embodiment, the material waiting housing 12 is further provided with a feeding port, and the die molding apparatus further includes a discharge valve 123 for sealing the discharge port and a feeding valve 122 for sealing the feeding port. The forming mold 32 loaded with the amorphous alloy 321 to be machined can be placed on the material loading arm 22 through the feeding port.

As shown in FIGS. 1 and 3, in an embodiment, the forming furnace body 11 includes a furnace body with a heating cavity 111 and a heating mechanism arranged in the heating cavity 111, the heating mechanism is used to heat the forming mold 32. In an embodiment, the heating mechanism includes a plurality of tantalum heaters, the tantalum heaters are arranged around the circumference of the lower pressure head 33, the heating temperature range of the heating mechanism is 373~1500K, and the heating rate is 2~30K/min.

In an embodiment, the die molding apparatus 100 further includes a human-machine interface, which is connected to the material waiting housing 12 and can rotate 360°.

In an embodiment, the die molding apparatus 100 further includes a control structure, which is a PLC control system and is used to control the forming structure 10, the material loading structure 20 and the vacuum pumping structure 50.

The aforementioned embodiments are only preferred embodiments of the present application. For one of ordinary skill in the art, according to the thought of the present application, specific implementation modes and application scopes may be modified, and the content of the specification should not be interpreted as any limitation to the present application.

What is claimed is:

1. A die molding apparatus for thermoplastic forming of an amorphous alloy, comprising:

a forming structure, comprising: a forming furnace body with a heating cavity; a material waiting housing with a transition cavity, a feeding pipe provided with two ends respectively in communication with the heating cavity and the transition cavity, and a vacuum control valve arranged on the feeding pipe;

a material loading structure, comprising: a material loading arm and a material loading driving mechanism; wherein the material waiting housing is provided with a material loading hole being in communication with the transition cavity, one end of the material loading arm is located in the transition cavity and configured for carrying the amorphous alloy, the other end of the material loading arm is configured to penetrate through the material loading hole sealingly and slidably, and the material loading driving mechanism is connected with the other end of the material loading arm; and a vacuum pumping structure, configured for pumping out gas in the heating cavity and the transition cavity, such that vacuum degrees of the heating cavity and the transition cavity reach a predetermined value;

wherein the vacuum control valve has a turn-on state and a turn-off state, and when the vacuum control valve is in the turn-on state, the feeding pipe communicates the heating cavity and the transition cavity, the material loading driving mechanism drives the material loading arm to slide, such that the material loading arm carries the amorphous alloy to the heating cavity or carries the amorphous alloy back to the transition cavity through the feeding pipe; and after the amorphous alloy is thermoplastic formed in the heating cavity, and is then conveyed to the transition cavity for cooling; the vacuum control valve is in the turn-off state, to seal and isolate the heating cavity from the transition cavity;

wherein a material waiting area is arranged in the transition cavity, an amorphous alloy to be thermoplastic formed is placed in the material waiting area in advance, and the vacuum degree of the transition cavity is pumped to the predetermined value; the material waiting area is further configured to receive a previous amorphous alloy being thermoplastic formed and conveyed from the heating cavity, and the amorphous alloy to be thermoplastic formed is then conveyed to the heating cavity to continue the thermoplastic forming of the amorphous alloy; and wherein die molding apparatus further comprises:

a mold mechanism, comprising:

an upper pressure head arranged in the heating cavity, a lower pressure head located below the upper pressure head and arranged slidably relative to the upper pressure head, a forming driving mechanism connected with the forming furnace body and configured for driving the lower pressure head to move up and down relative to the upper pressure head, and a forming mold detachably arranged on the lower pressure head; the forming mold is provided with a forming cavity configured for accommodating the amorphous alloy, and the lower pressure head moves toward the upper pressure head to press against the forming mold to plastically form the amorphous alloy.

2. The die molding apparatus according to claim 1, wherein the forming structure further comprises:

a heat insulation mechanism, comprising a heat insulation shield arranged in the heating cavity and a heat insulation driver connected with the forming furnace body; the heat insulation driver drives the heat insulation shield to seal an orifice of the feeding pipe, so as to prevent heat from entering the transition cavity through the feeding pipe.

3. The die molding apparatus according to claim 1, wherein the material loading arm comprises an arm body and a clamping claw arranged at an end of the arm body, the other end of the arm body passes through the material loading hole and is connected with the material loading driving mechanism, the clamping claw is located in the transition cavity and configured to detachably clamp the forming mold.

4. The die molding apparatus according to claim 3, wherein the clamping claw is provided with a clamping groove, and an end of the forming mold is clamped in the clamping groove.

5. The die molding apparatus according to claim 4, wherein groove walls on both sides of the clamping groove are protruded with positioning blocks, and positions on the forming mold corresponding to the positioning blocks are provided with positioning grooves matched with the positioning blocks.

6. The die molding apparatus according to claim 1, further comprising: a cooling structure configured for cooling the forming mold.

7. The die molding apparatus according to claim 6, wherein the cooling structure comprises a lower cooling column vertically arranged and provided with a lower cooling channel; an end of the lower cooling column is located in the transition cavity and provided with a cooling end surface configured for placing the forming mold, and the other end of the lower cooling column is located outside of the transition cavity and connected with an external cooling water source.

8. The die molding apparatus according to claim 7, wherein the lower cooling column is connected with the material waiting housing slidably and sealingly.

9. The die molding apparatus according to claim 8, wherein the cooling structure further comprises a cooling driving mechanism for driving the lower cooling column to slide up and down, and an upper cooling column arranged opposite to be to the lower cooling column, the upper cooling column is provided with an upper cooling channel.

10. The die molding apparatus according to claim 7, wherein the material waiting housing is provided with a discharge port arranged in communication with the transition cavity, and the die molding apparatus further comprises a blanking groove, one end of the blanking groove is connected with the discharge port, and the other end of the blanking groove is arranged adjacent to the cooling end surface.

11. The die molding apparatus according to claim 10, wherein the material waiting housing is further provided with a feeding port, and the die molding apparatus further comprises a discharging valve configured for sealing the discharging port and a feeding valve configured for sealing the feeding port.

12. The die molding apparatus according to claim 1 wherein the forming furnace body comprises a furnace body provided with the heating cavity and a heating mechanism arranged in the heating cavity.

* * * * *